(12) United States Patent
Nielsen

(10) Patent No.: US 6,175,096 B1
(45) Date of Patent: Jan. 16, 2001

(54) METHOD OF PROCESSING A MATERIAL BY MEANS OF A LASER BEAM

(75) Inventor: Steen Erik Nielsen, Skævinge (DK)

(73) Assignee: Force Instituttet, Brondby (DK)

( * ) Notice: Under 35 U.S.C. 154(b), the term of this patent shall be extended for 0 days.

(21) Appl. No.: 09/269,197

(22) PCT Filed: Sep. 30, 1997

(86) PCT No.: PCT/DK97/00412

§ 371 Date: Mar. 30, 1999

§ 102(e) Date: Mar. 30, 1999

(87) PCT Pub. No.: WO98/14302

PCT Pub. Date: Apr. 9, 1998

(30) Foreign Application Priority Data

Sep. 30, 1996 (DK) .................................................. 1067/96
Sep. 23, 1997 (DK) .................................................. 1091/97

(51) Int. Cl.⁷ .................................................. B23K 26/38
(52) U.S. Cl. .................................. 219/121.72; 219/121.75
(58) Field of Search ........................ 219/121.73, 121.74, 219/121.75, 121.67, 121.72, 121.71

(56) References Cited

U.S. PATENT DOCUMENTS 5,063,280 * 11/1991 Inagawa et al. ................. 219/121.71
5,521,352 * 5/1996 Lawson ........................... 219/121.67
5,690,845 * 11/1997 Fuse ................................ 219/121.74

FOREIGN PATENT DOCUMENTS

| 2713904 | * | 10/1978 | (DE) . |
| 4034745 | * | 7/1991 | (DE) . |
| 56-122690 | * | 9/1981 | (JP) . |
| 63-299881 | * | 12/1988 | (JP) . |
| 64-48692 | * | 2/1989 | (JP) . |
| 1-143783 | * | 6/1989 | (JP) .................................. 219/121.75 |

* cited by examiner

*Primary Examiner*—Geoffrey S. Evans
(74) *Attorney, Agent, or Firm*—Oblon, Spivak, McClelland, Maier & Neustadt, P.C.

(57) ABSTRACT

A method of processing material with a laser beam. The material has two surfaces. The beam is focused by a multilens objective in a number of focal points which are approximately positioned on a common axis with an angle to the first surface. The focal points are spaced apart and used for cutting plates with several focal points being utilized for melting and cutting the plate material. As a result, a good cutting notch is obtained with good separation of the cut parts and poor adhesion of slag.

6 Claims, 3 Drawing Sheets

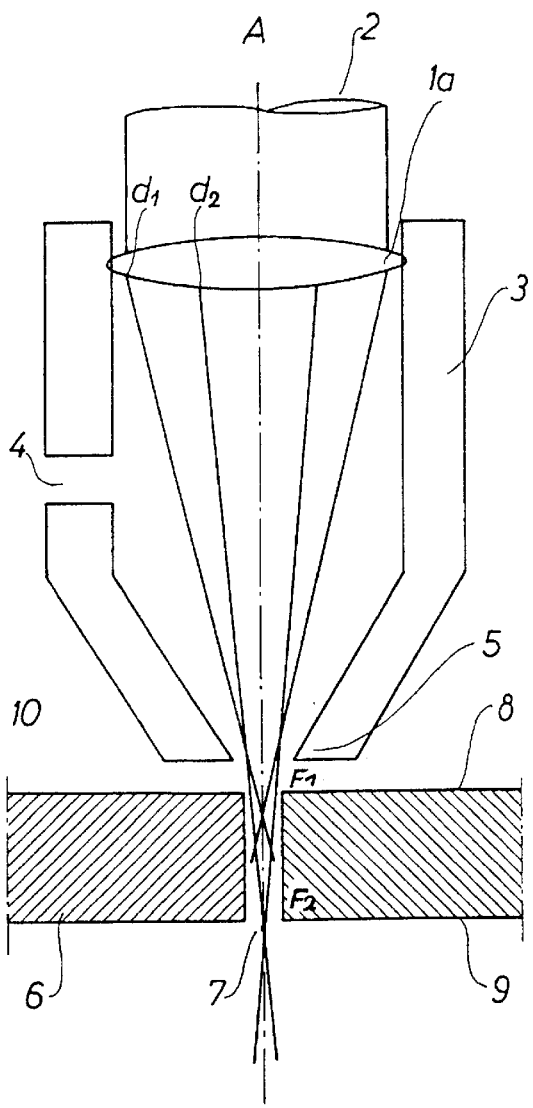
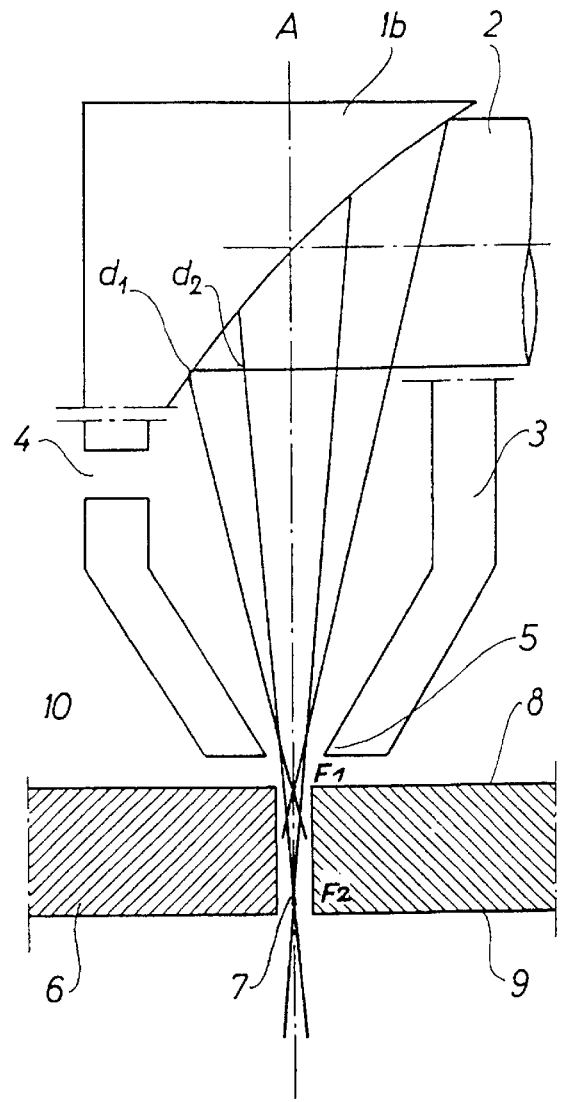
Fig. 1a
Fig. 1b

METHOD OF PROCESSING A MATERIAL BY MEANS OF A LASER BEAM

BACKGROUND OF THE INVENTION

1. Field of the Invention

The invention relates to a method of processing a material with a first and a second surface by means of a laser beam which for instance by means of a multilens objective is focused in a number of focal points, where said focal points are approximately positioned on a common axis forming an angle with the first surface and are spaced apart.

2. Discussion of the Background

German Auslegeschrift No. 2,713,904 discloses a way of processing an article by means of a laser beam, said laser beam being focused in two focal points by means of a multilens objective. This processing method is used for drilling holes, whereby one focused bundle of rays is used for a melting of the surface of the article and the second bundle of rays presents a focal point positioned below the focal point of the first bundle of rays and is used for preheating the area surrounding the location of the article to be melted so as subsequently to be removed by way of evaporation. Such a processing method avoids to a certain degree formation of burrs at the edge of the hole. The lower focal point is, however, not utilized.

A growing demand has applied within the material processing industry employing lasers for a possibility of cutting in thick plates, such as steel plates of a thickness of 15 mm or more. As the cutting capacity of the laser beam is best on or adjacent the surface it is focused on, problems apply to transferring the effect to portions of the plate positioned below said surface. Moreover, the second surface of the material is encumbered with problems of an increased amount of adhering slags and a poor cutting quality, which inter alia results in a poor separation of the cut parts and may necessitate a finishing processing.

SUMMARY OF THE INVENTION

The object of the invention is to provide a method of processing material by means of a laser, which ensures an improved processing quality in connection with thick materials. Furthermore, the expenditure of protecting gases must be low.

A method of the above type is according to the invention used for cutting plates, whereby several focal points are utilized for melting and cutting the plate material. The multilens objective has the effect that the total bundle of rays is relatively narrow, whereby the nozzle for protecting gases and consequently the expenditure of said protecting gases can be reduced correspondingly. It is well known that the protecting gases are very important for the quality and the cut.

According to a preferred embodiment of the invention, the focal points are positioned at a fixed distance relative to one another and to the first and the second surface.

It is advantageous for the complexity of the focusing optical instruments when the number of focal points is two.

It is furthermore advantageous when the distance between the head comprising the optical instruments and the first surface can be increased in such a manner that the focal point adjacent the second surface during the cutting can be caused to be positioned on the first surface, the so-called starting holes thereby being provided in an improved manner. In addition, the risk of the optical instrument being damaged by metal sprayings has been reduced.

A further advantage is found in connection with ignition, melting and removal of melt and slags by at least one of the focal points being positioned between the first and the second surface, adjacent the second surface or adjacent the first and the second surface, respectively, In order to facilitate the penetration of the laser beam into the cutting notch it is furthermore advantageous when the focusing optical instruments focus the laser beam in several focal points, the distance of which from the second surface is increased concurrently with an increasing distance of the light from the central axis of the laser beam in such a manner that the central portion of the laser beam is focused in the focal point adjacent the second surface.

BRIEF DESCRIPTION OF THE DRAWING

Two embodiments of the invention are described in greater detail below with reference to the accompanying drawing, in which FIG. 1a illustrates a laser cutting head with transmittent optical instruments, FIG. 1b illustrates a laser cutting head with reflecting optical instruments.

DETAILED DESCRIPTION OF THE PREFERRED EMBODIMENTS

Figure 2A:
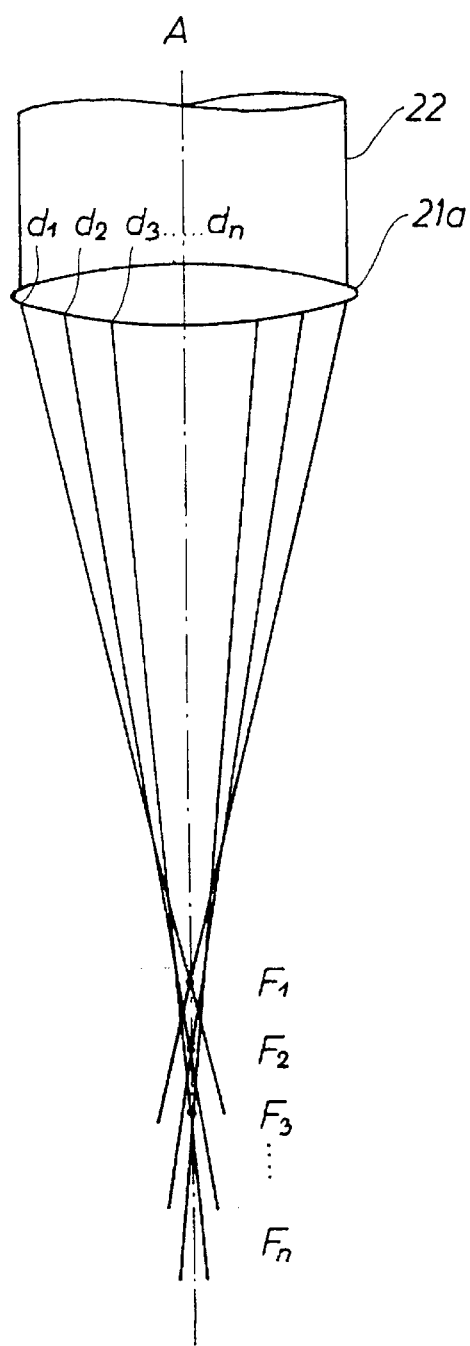
FIG. 2a shows a transmittent optical instrument forming three focal points.

Reference is first made to FIG. 1a, where a plate 6 to be cut by means of a laser is shown. The plate comprises a first surface 8 and a second surface 9. A movable, integrated optics/nozzle system, also called a cutting head 10, is provided above the first surface 8 of the plate 6. The cutting head 10 is movable in a plane parallel to the first surface 8 of the material to be cut in, whereby optional shapes can be cut in said material. The latter is known per se and is therefore not discussed in greater detail. Furthermore the cutting head 10 is movable to a predetermined degree perpendicular to the first surface 8 in such a manner that during the cutting it can enter an optimum distance relative to a flow of cutting gas and the focusing of the laser beam 2.

The cutting head 10 comprises a pressure chamber 3 with an inlet opening 4 allowing a continuous filling of cutting gases into said pressure chamber 3, as well as an outlet opening 5 directing the gas towards the cutting location. The gas used depends on the material to be cut, but typically it is oxygen in connection with ordinary steel to be burnt away, or an inert gas, such as nitrogen, in connection with stainless steel being melt away.

In addition, the cutting head 10 comprises an optical instrument 1a, 1b, 21a, 21b focusing a laser beam 2 in a number of focal points $F_1, F_2, \ldots, F_n$. These focal points are scattered on a common axis A, which forms an angle, typically a right angle with the first surface 8 of the material to be cut. These focal points $F_1, F_2, \ldots, F_n$ are interspaced a fixed distance relative to one another and relative to the first and the second surface 8, 9 of the material. For illustrative reasons, the FIGS. 1a and 1b are diagrammatic vies of a cutting notch 7, in which the focal point F . . . is positioned.

In the embodiment shown in FIG. 1, the optical instrument 1a, 1b is formed such that the central portion of the instrument, i.e. within $d_2$, focuses the central portion of the laser beam 2 in the focal point $F_2$ adjacent the second surface 9 of the material, whereas the circumferential portion outside $d_2$ focuses the outer portion of said laser beam 2 in the focal point $F_1$ adjacent the first surface 8 of the material. In the illustrated embodiment, the focal point $F_1$ is placed above the surface 8 in view of the cutting, but it is also possible to place all the focal points $F_1, F_2, \ldots, F_n$ between the first and the second surface 8, 9.

The optical instrument can be structured in many ways. The Figures illustrate simple embodiments using a lens 1a or a mirror 1b.

Figure 2B:
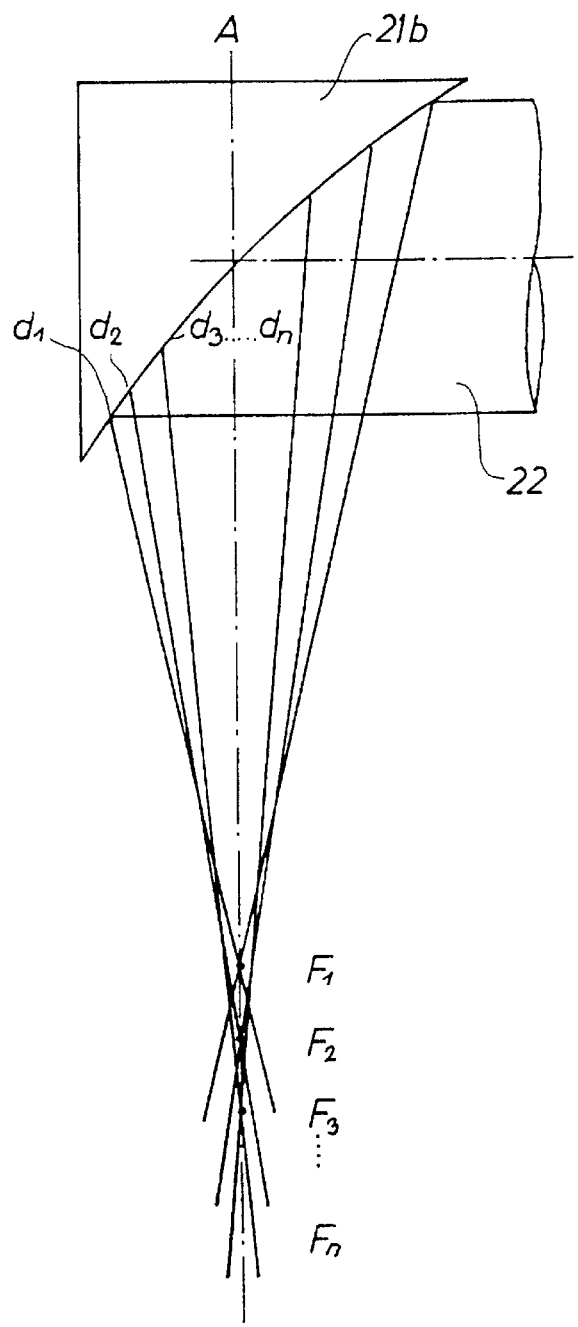
FIG. 2b shows a reflecting optical instrument forming three focal points.

The FIGS. 2a and 2b show embodiments of optical instruments 21a, 21b with several focal points $F_1, F_2, \ldots, F_n$, only three being illustrated for the sake of clarity. In this case, the focal points of respective concentric portions of the optical instrument 21a, 21b are formed such that the focal length decreases concurrently with an increasing distance from the centre.

Figure 3A:
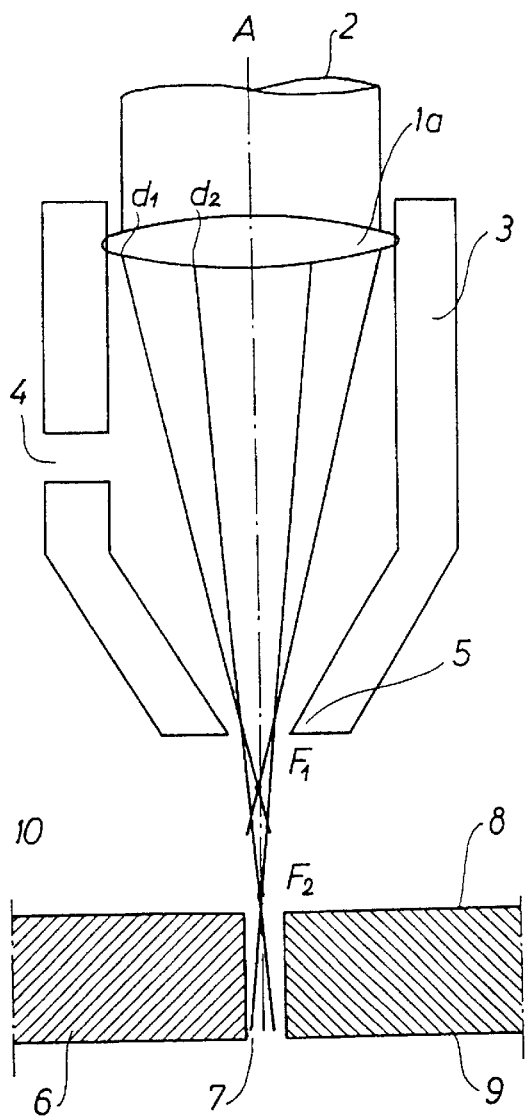
FIG. 3a illustrates the cutting head of FIG. 1a at a distance from the surface.
Figure 3B:
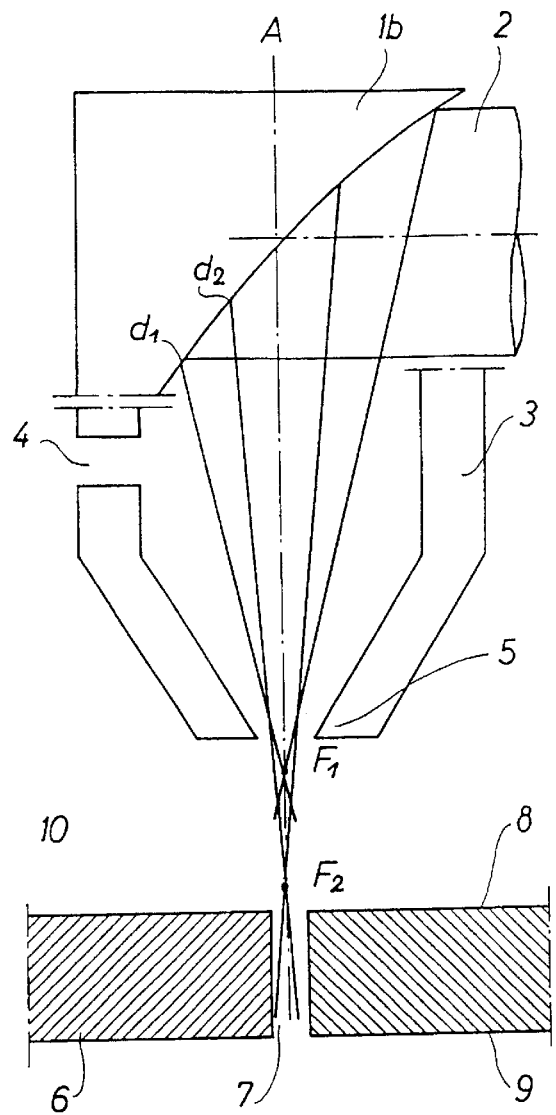
FIG. 3b illustrates the cutting head of FIG. 1b at a distance from the surface.

The distance between the entire cutting head 10 and the first surface is variable in such a manner that during the starting procedure it can be increased whereby the focal point $F_2$ ordinarily positioned adjacent the second surface 9 during the cutting can be caused to be positioned on the first surface. The resistingly increased distance between the cutting head 10 and the first surface 8 reduces the risk of sprayings of melt material returning through the nozzle 5 so as to destroy the optical instruments 1a, 1b, cf. FIGS. 3a and 3b where the diagrammatic cutting notch 7 has been maintained for illustrative reasons so as to provide an improved view of the beam passage, but said notch does not, of course, exist before the cutting has been initiated.

Although the embodiments include simple lens members, it is also possible to use more complicated arrangements, such as combinations of lenses which in combination form the desired number of focal points.

It is also possible to a certain degree to deviate from the exact axial positioning of the focal points or the right angle of this axis with the surface without deviating from the basic idea of the invention. Such a procedure is for instance possible as long as it is advantageous for the cutting speed that the cutting in the deep layers is performed involving a minimum displacement relative to the layers thereabove.

What is claimed is:

1. A method of processing a plate material with a first surface and a second surface by means of a laser beam, comprising the steps of:

focusing the laser beam by means of a multilens objective at plural focal points, positioned approximately on a common axis forming an angle with the first surface and fixed spaced apart from one another; and using the focal points for melting and cutting the plate material, including focusing a first focal point at a first distance along said axis and a second focus point at second distance farther from said multlens objective along said axis, starting cutting with said second focal point positioned on the first surface, varying, after said starting cutting step, a location of said multilens objective relative to said plate material so that said first focal point is positioned adjacent said first surface and said second focal point is positioned adjacent said second surface.

2. The method of claim 1, using only said first and second focal points for melting and cutting.

3. The method of claim 1, comprising:

focusing a central portion of the laser beam at said second focal point.

4. The method of claim 1, wherein said focusing step comprises:

focusing the laser beam at plural focal points, such that after the step of starting and cutting the distance of the focal points from the second surface is increased concurrently with the increasing distance of the light from the central axis of the laser beam.

5. A method of processing a plate material with a first surface and a second surface by means of a laser beam, comprising the steps of:

focusing the laser beam by means of a multilens objective at plural focal points, positioned approximately on a common axis forming an angle with the first surface and fixed spaced apart from one another; and using the focal points for melting and cutting the plate material, including focusing a central portion of the laser beam in a first focal point, starting cutting with said first focal point positioned on the first surface, varying, after said starting cutting step, a location of said multilens objective relative to said plate material so that said first focal point is positioned adjacent said second surface and a second focal point is positioned adjacent said first surface.

6. The method of claim 5, wherein said focusing step comprises:

focusing the laser beam at plural focal points, such that after the step of starting and cutting the distance of the focal points from the second surface is increased concurrently with the increasing distance of the light from the central axis of the laser beam.

* * * * *